(12) United States Patent
Sharma et al.

(10) Patent No.: US 11,836,511 B2
(45) Date of Patent: Dec. 5, 2023

(54) FUNCTION ARBITRATION AND QUALITY OF SERVICE FOR MEMORY COMMANDS

(71) Applicant: Micron Technology, Inc., Boise, ID (US)

(72) Inventors: Prateek Sharma, San Jose, CA (US); Bridget L. Mallak, Forest Lake, MN (US); Kevin R. Duncan, Ramsey, MN (US)

(73) Assignee: Micron Technology, Inc., Boise, ID (US)

( * ) Notice: Subject to any disclaimer, the term of this patent is extended or adjusted under 35 U.S.C. 154(b) by 382 days.

(21) Appl. No.: 16/868,643

(22) Filed: May 7, 2020

(65) Prior Publication Data

US 2021/0200568 A1 Jul. 1, 2021

Related U.S. Application Data

(60) Provisional application No. 62/954,852, filed on Dec. 30, 2019.

(51) Int. Cl.
*G06F 9/455* (2018.01)
*G06F 9/48* (2006.01)
*G06F 9/445* (2018.01)
*G06F 13/16* (2006.01)
*G06F 11/30* (2006.01)
*G06F 9/38* (2018.01)

(52) U.S. Cl.
CPC ........ *G06F 9/45558* (2013.01); *G06F 9/3836* (2013.01); *G06F 9/44505* (2013.01); *G06F 9/4818* (2013.01); *G06F 11/3037* (2013.01); *G06F 13/1605* (2013.01); *G06F 2009/45583* (2013.01)

(58) Field of Classification Search
CPC .............. G06F 9/45558; G06F 9/3836; G06F 9/44505; G06F 9/4818; G06F 11/3037; G06F 13/1605; G06F 2009/45583
See application file for complete search history.

(56) References Cited

U.S. PATENT DOCUMENTS

| | | | |
|---|---|---|---|
| 8,314,807 B2 | 11/2012 | Biswas et al. | |
| 8,762,653 B2 | 6/2014 | Biswas et al. | |
| 10,037,299 B1* | 7/2018 | Ramey | G06F 13/4221 |
| 2005/0044321 A1* | 2/2005 | Bialkowski | G06F 12/084 |
| | | | 711/167 |
| 2006/0174050 A1* | 8/2006 | Chadha | G06F 13/4059 |
| | | | 710/310 |

(Continued)

*Primary Examiner* — Brian T Misiura
(74) *Attorney, Agent, or Firm* — Brooks, Cameron & Huebsch, PLLC (57) ABSTRACT

A processing device of a memory sub-system can receive a plurality of commands from a plurality of virtual machines via a host interface and associate each of the plurality of commands with a respective function that represents a respective virtual machine from which each of the plurality of commands was received. The controller of the memory sub-system can also setup a respective definition of a respective quality of service for each respective function regarding consumption of resources of the memory device, wherein the controller comprises arbitration circuitry to handle each of the plurality of commands on a per function basis according to the definition.

19 Claims, 7 Drawing Sheets

(56) References Cited

U.S. PATENT DOCUMENTS

2015/0007189 A1* 1/2015 De Gruijl ............... H04L 47/39
                                                    718/104
2016/0004438 A1    1/2016 Moon et al.
2018/0217951 A1*  8/2018 Benisty ............... G06F 13/1642

* cited by examiner

FUNCTION ARBITRATION AND QUALITY OF SERVICE FOR MEMORY COMMANDS

PRIORITY INFORMATION

This application claims priority to U.S. Provisional Application Ser. No. 62/954,852, filed Dec. 30, 2019, the contents of which are incorporated herein by reference.

TECHNICAL FIELD

Embodiments of the disclosure relate generally to memory sub-systems, and more specifically, relate to providing a quality of service for memory commands from a function.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to memory sub-systems that provide a quality of service for memory commands from a function. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices, such as memory devices that store data. The host system can provide data to be stored at the memory sub-system and can request data to be retrieved from the memory sub-system.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information can be part of metadata for the host data.

A host system can implement a virtualized environment utilizing a virtualization-intermediary software (e.g., hypervisor). A conventional hypervisor executed by the host system can enforce one or more policies for accessing a memory sub-system. For example, one or more of virtual machines (VMs) can access a memory sub-system via a hypervisor. The hypervisor can implement the policies to limit the access that the VMs have to the memory sub-system. However, given that the hypervisor can be implemented in software (e.g., implemented via machine executable instructions) the hypervisor can be less efficient than if the policies were implemented in hardware.

The hypervisor can be bypassed for input/output (I/O) traffic from the VMs to the memory sub-system. However, bypassing the hypervisor's enforcement of the policies can enable any one of the VMs from utilizing all available hardware resources of the memory sub-system. Enabling any one of the VMs to utilize available hardware resources without limits can prevent the other VMs from accessing the hardware resources due to starvation of the hardware resources. Enabling any one of the VMs to utilize available hardware resources without limits can result in the violation of the service-level agreements (SLA) associated with the other VMs. Enabling any one of the VMs to utilize available hardware resource without limits can render the memory sub-system as a bottleneck which can limit the efficiency of the host system.

As used herein, an SLA is a commitment between a service provider and a client. The SLA defines aspects of the service that is provided by the service provider. For instance, the SLA can define a quality of service (QOS) that is provided to the client. The definition of the QOS includes a specified value or range of values of one or more measurable levels of the service that is provided by the service provider. The definition of the QOS can include a low threshold and/or a high threshold of the measurable level of service. Examples of measurable levels of service include the amount of data that can be read from and written to one or more memory devices in a given time period, I/O per time period and in terms of throughput (e.g., MB) per time period, etc.

Aspects of the present disclosure address the above and other deficiencies. To improve performance of access to the memory sub-system, the policies corresponding to the SLA can be enforced by the memory sub-system. The VMs can provide commands to the memory sub-system without a policy enforcement mechanism implemented by the hypervisor. For example, the VMs can be natively coupled to the memory sub-system via a hardware mechanism such at a single-root I/O virtualization (SRIOV) with the assistance of the hypervisor running on a host system. Providing the VMs with access to the memory sub-system while enforcing the SLA in the memory sub-system can provide the VMs with near native access to the memory sub-system.

The memory sub-system can receive the I/O traffic directly from the VMs. The memory sub-system can utilize functions to represent the VMs. As used herein, a function is a logical and/or physical representation of a logical device. For example, a function can be a logical representation of one of the VMs of a computing system. A peripheral component interconnect express (PCIe) function is can example of a function that can represent the VMs.

The figures herein follow a numbering convention in which the first digit or digits correspond to the drawing figure number and the remaining digits identify an element or component in the drawing. Similar elements or components between different figures may be identified by the use of similar digits. For example, 103 may reference element "03" in FIG. 1, and a similar element may be referenced as 203 in FIG. 2. Analogous elements within a Figure may be referenced with a hyphen and extra numeral or letter. See, for example, elements 221-1, . . . , 221-N in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
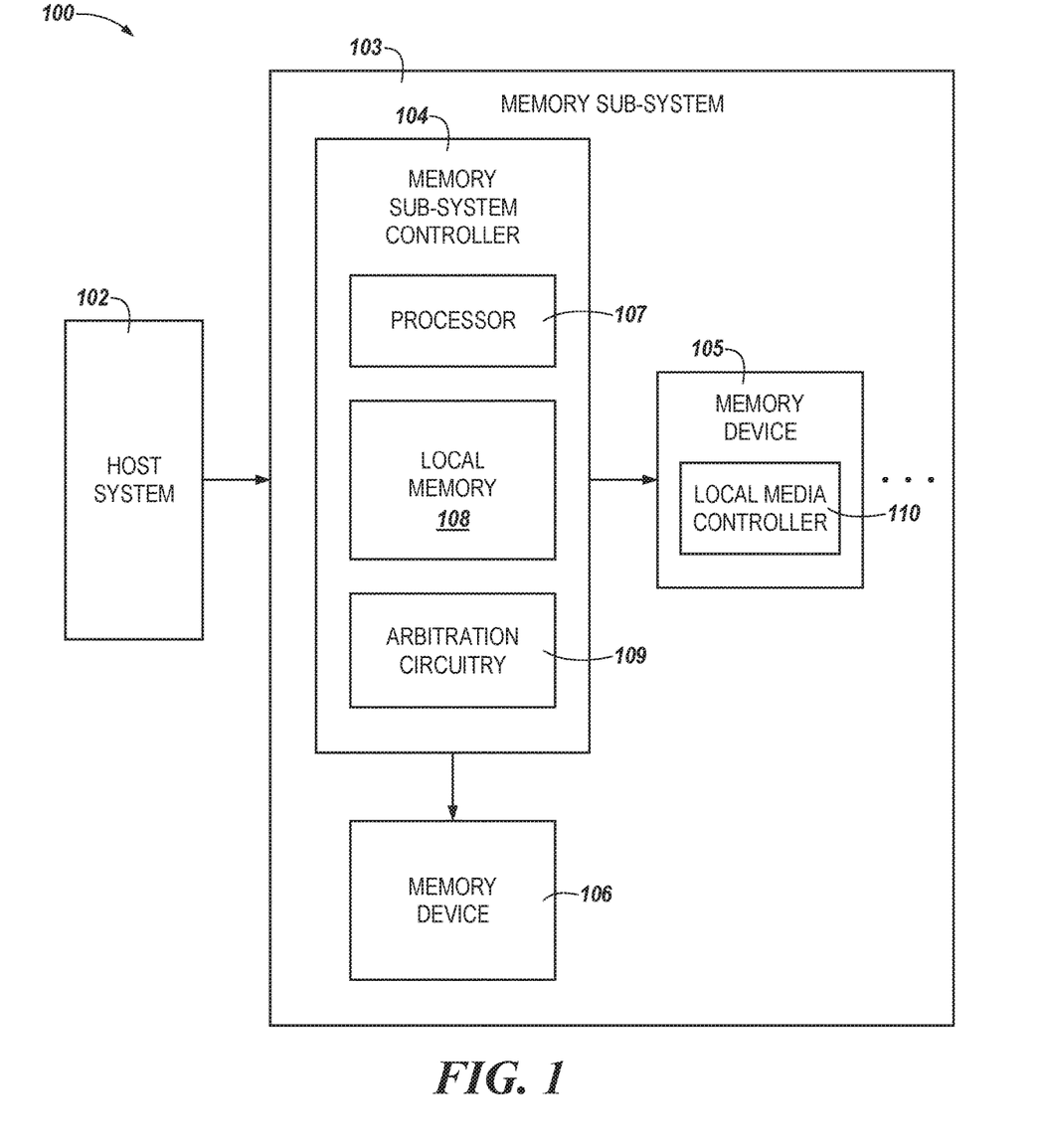
FIG. 1 illustrates an example computing system that includes a memory sub-system in accordance with some embodiments of the present disclosure.

FIG. 1 illustrates an example computing system 100 that includes a memory sub-system 103 in accordance with some embodiments of the present disclosure. The memory sub-system 103 can include media, such as one or more volatile memory devices (e.g., memory device 106), one or more non-volatile memory devices (e.g., memory device 105), or a combination of such.

A memory sub-system 103 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 102 that is coupled to one or more memory sub-systems 103. In some embodiments, the host system 102 is coupled to different types of memory sub-systems 103. FIG. 1 illustrates an example of a host system 102 coupled to one memory sub-system 103. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 102 can be coupled to the memory sub-system 103 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 103. The host system 102 can further utilize an NVM Express (NVMe) interface to access the memory component (e.g., memory devices 105) when the memory sub-system 103 is coupled with the host system 102 by the PCIe interface. The physical host interface can provide an interface for passing control, address, data, and other signals between the memory sub-system 103 and the host system 102. FIG. 1 illustrates a memory sub-system 103 as an example. In general, the host system 102 can access multiple memory sub-systems via a same communication connection, multiple separate communication connections, and/or a combination of communication connections.

The memory devices 105, 106 can include any combination of the different types of non-volatile memory devices 105 and/or volatile memory devices 106. The volatile memory devices (e.g., memory device 106) can be, but are not limited to, random access memory (RAM), such as dynamic random access memory (DRAM) and synchronous dynamic random access memory (SDRAM).

Some examples of non-volatile memory devices (e.g., memory device 105) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 105 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 105, 106 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 105, 106 can be grouped as pages that can refer to a logical unit of the memory device used to store data. With some types of memory (e.g., NAND), pages can be grouped to form blocks.

Although non-volatile memory devices 105 such as a 3D cross-point array of non-volatile memory cells and NAND type memory (e.g., 2D NAND, 3D NAND) and 3D cross-point array of non-volatile memory cells are described, the memory device 105 can be based on any other type of non-volatile memory or storage device, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 104 (or controller 104 for simplicity) can communicate with the memory devices 105 to perform operations such as reading data, writing data, or erasing data at the memory devices 105 and other such operations. The memory sub-system controller 104 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 104 can be a microcontroller, special purpose logic circuitry (e.g., a field programmable gate array (FPGA), an application specific integrated circuit (ASIC), etc.), or other suitable processors.

The memory sub-system controller 104 can include a processor 107 (e.g., a processing device) configured to execute instructions stored in local memory 108. In the illustrated example, the local memory 108 of the memory sub-system controller 104 includes an embedded memory configured to store instructions for performing various processes, operations, logic flows, and routines that control operation of the memory sub-system 103, including handling communications between the memory sub-system 103 and the host system 102.

In some embodiments, the local memory 108 can include memory registers storing memory pointers, fetched data, etc. The local memory 108 can also include read-only memory (ROM) for storing micro-code, for example. While the example memory sub-system 103 in FIG. 1 has been illustrated as including the memory sub-system controller 104, in another embodiment of the present disclosure, a memory sub-system 103 does not include a memory sub-system controller 104, and can instead rely upon external control (e.g., provided by an external host, or by a processor or controller separate from the memory sub-system).

In general, the memory sub-system controller 104 can receive commands or operations from the host system 102 and can convert the commands or operations into instructions or appropriate commands to achieve the desired access to the memory devices 105 and/or the memory device 106. The memory sub-system controller 104 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 105. The memory sub-system controller 104 can further include host interface circuitry to communicate with the host system 102 via the physical host interface. The host interface circuitry can convert the commands received from the host system into command instructions to access the memory devices 105 and/or the memory device 106 as well as convert responses associated with the memory devices 105 and/or the memory device 106 into information for the host system 102.

The memory sub-system 103 can also include additional circuitry or components that are not illustrated. In some embodiments, the memory sub-system 103 can include a cache or buffer (e.g., DRAM) and address circuitry (e.g., a row decoder and a column decoder) that can receive an address from the memory sub-system controller 104 and decode the address to access the memory devices 105.

In some embodiments, the memory sub-system controller 104 includes at least a portion of the arbitration circuitry 109. For example, the memory sub-system controller 104 can include a processor 107 (processing device) configured to execute instructions stored in local memory 108 for performing the operations described herein. In some embodiments, the arbitration circuitry 109 is part of the host system 102, an application, or an operating system.

In some embodiments, the memory devices 105 include a local media controller 110 that operates in conjunction with memory sub-system controller 104 to execute operations on one or more memory cells of the memory devices 105. An external controller (e.g., memory sub-system controller 104) can externally manage the memory device 105 (e.g., perform media management operations on the memory device 105). In some embodiments, a memory device 105 is a managed memory device, which is a raw memory device combined with a local controller (e.g., local controller 110) for media management within the same memory device package. An example of a managed memory device is a managed NAND (MNAND) device.

Figure 4:
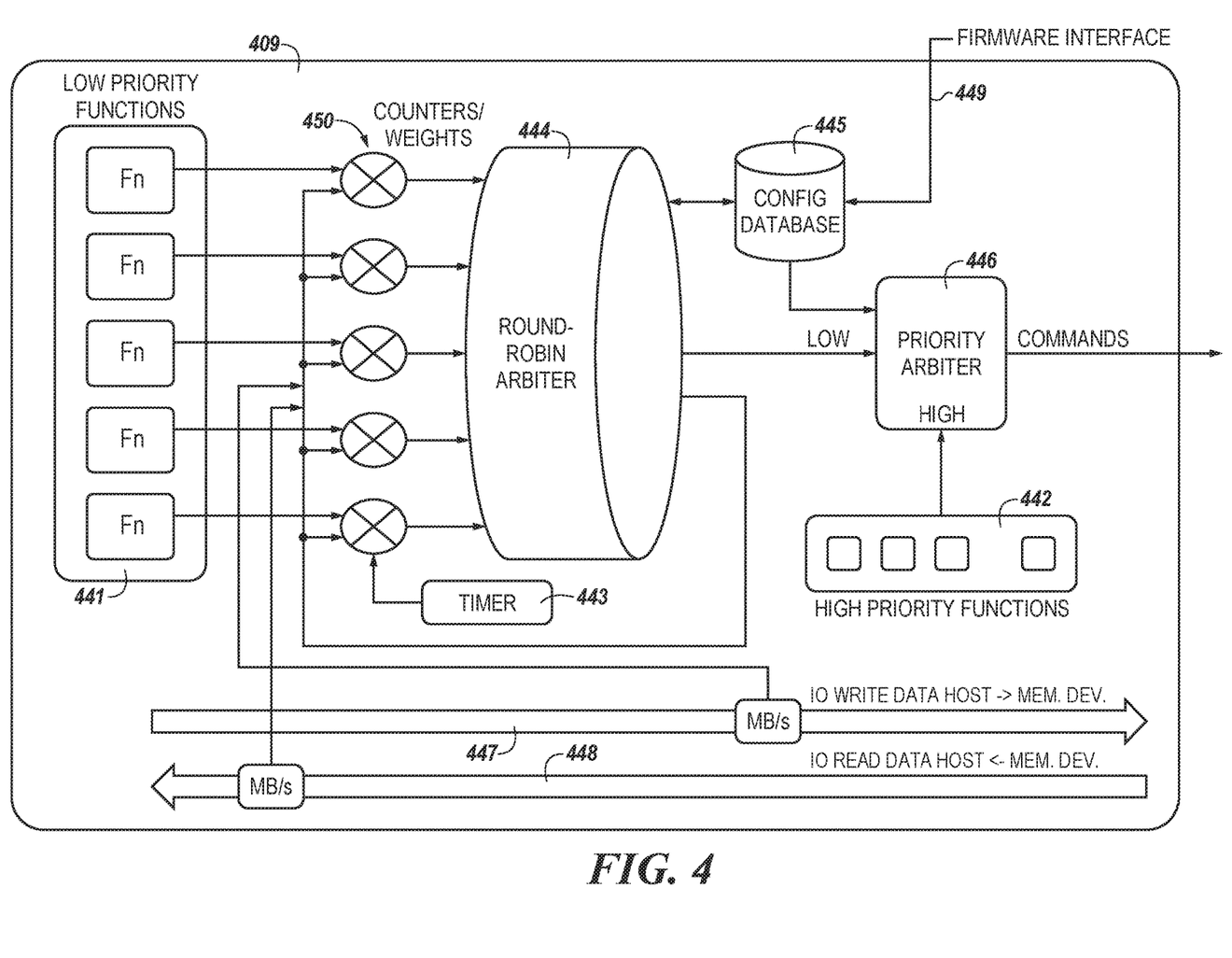
FIG. 4 illustrates an example of arbitration circuitry in accordance with some embodiments of the present disclosure.

The memory sub-system controller 104 can also include arbitration circuitry 109. As used herein, the arbitration circuitry 109 can comprise an ASIC configured to perform the examples described herein. FIG. 4 provides an example of the arbitration circuitry 109. The arbitration circuitry 109 can handle commands received from VMs and provide the commands to the processor 107. The arbitration circuitry 109, in some embodiments, can alter the commands, reorder the commands, or otherwise handle the commands in a manner that efficiently allocates bandwidth and access to the memory devices 105, 106. The VMs can be managed by a hypervisor which is executed by the host system 102.

The arbitration circuitry 109 can provide the commands received from the VMs such that SLAs corresponding to the VMs are met. In various examples, the SLAs can describe the amount of data that can be read from and written to one or more memory devices 105, 106 in a given time period. For example, an SLA corresponding to a VM can describe that each of the memory devices 105, 106 can write up to a first amount of data received from the VM and can read up to a second amount of data that is provided to the VM. The arbitration circuitry 109 can balance the commands that are processed by the processor 107 such that each of the VMs' SLAs are met.

The arbitration circuitry 109 can also track the quantity of commands received from a corresponding VM and by the memory sub-system 103. The arbitration circuitry 109 can further track the quantity of accesses of the memory devices 105, 106 by each VM. The arbitration circuitry 109 can further limit the quantity of accesses of the memory devices 105, 106 for each VM. If a VM exhausts the amount of data that it writes and/or reads, then the arbitration circuitry 109 can refrain from providing additional commands received from the VM to the processor 107 during a time period.

In various examples, the SLA can define a minimum and maximum level or service in terms of I/O per time period and in terms of throughput (e.g., MB) per time period. The arbitration circuitry 109 can be run-time programmable and can adjust to new requirements while the system 100 is running.

Figure 2:
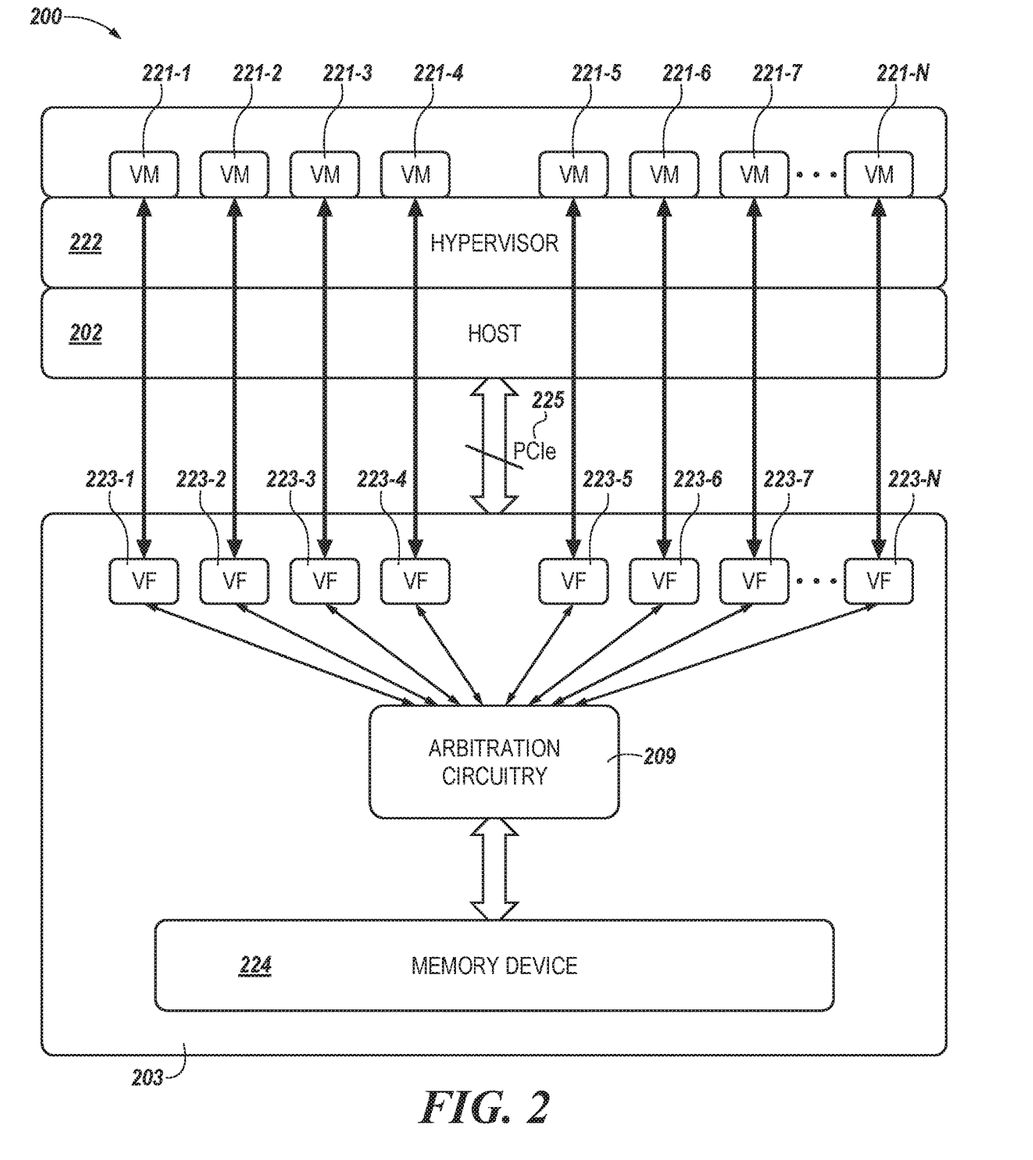
FIG. 2 illustrates an example of a computing system that includes a memory sub-system in accordance with some embodiments of the present disclosure.

FIG. 2 illustrates an example of a computing system 200 that includes a memory sub-system 203 in accordance with some embodiments of the present disclosure. The computing system 200 can include a host 202. The host 202 can execute a hypervisor 222. The hypervisor 222 can manage the VMs 221-1 to 221-N, referred to as VMs 221.

As used herein, the VMs 221 can emulate computing systems. The VMs 221 can emulate computer architectures and can provide the functionality of the computing system 200. A VM 221 refers generally to an isolated end user space instance, which can be executed within a virtualized environment. Other technologies aside from hardware virtualization can provide isolated end user space instances may also be referred to as VMs 221, such as containers. As used herein, the term "VM" covers these examples and combinations of different types of VMs, among others. VMs, in some embodiments, operate with their own guest operating systems on a host using resources of the host virtualized by virtualization software (e.g., a hypervisor 222, virtual machine monitor, etc.). Each of the VMs 221 can access the memory sub-system 203.

The hypervisor 222 can include software that is executed by the host 202. The hypervisor 222 can create and/or host the VMs 221. The hypervisor 222 can manage the execution of the guest operating systems executed by the VMs 221. For example, the hypervisor 222 can receive commands from the VMs 221 intended for the memory sub-system 203. The hypervisor 222 executed by the host 202 can provide the commands to the memory sub-system 203 via the interface 225. The interface 225 can be implemented utilizing a bus standard such as a PCIe.

The hypervisor 222 can provide the commands originating from the VMs 221 to the memory sub-system 203 without performing additional processing of the commands. For example, the hypervisor 222 can refrain from determining whether the VMs exceed a definition of a QOS associated with the SLA by providing the commands to the memory sub-system 203. Furthermore, the hypervisor 222 can refrain from making a determination of whether to provide commands originated from the VMs 221 to the memory sub-system 203.

The hypervisor 222 can provide commands from the VMs 221 to the memory sub-system 203 utilizing mechanisms such as an SRIOV. The memory sub-system 203 can comprise the functions 223-1 to 223-N, the arbitration circuitry 209 and the memory device 224. The memory sub-system 203 can receive the commands via the interface 225 and utilizing multiple functions 223-1 to 223-N, referred to as functions 223. The functions 223 can include virtual functions (VF) and physical functions (PF). The functions 223 are shown in FIG. 2 as virtual functions. The functions 223 can be PCIe functions, for example. The interface 225 can also be referred to as a physical function. The physical function can be shared by the VMs 221. The virtual functions 223 allow the interface 225 to appear as multiple different physical interfaces each with its own PCIe configuration space.

Accordingly, the virtual functions (e.g., functions 223) can allow commands to be received from the VMs 221 while allowing the commands to be associated with the VMs 221. For example, the function 223-1 can correspond to the VM 221-1, the function 223-2 can correspond to the VM 221-2, the function 223-3 can correspond to the VM 221-3, the function 223-4 can correspond to the VM 221-4, the function 223-5 can correspond to the VM 221-5, the function 223-6 can correspond to the VM 221-6, the function 223-7 can correspond to the VM 221-7, . . . , and the function 223-N can correspond to the VM 221-N.

The arbitration circuitry 209 can receive the commands from the functions 223. The arbitration circuitry 209 can determine whether to provide the commands to a processor of the memory sub-system 203 for execution or to refrain from providing the commands to the processor of the memory sub-system 203. Responsive to determining that the commands are to be provided to the processor of the memory sub-system 203, the commands can be executed to write data to the memory device 224 and/or read data from the memory device 224. The arbitration circuitry 209 can determine whether to provide the commands based on a definition of a QOS of an SLA corresponding to each of the VMs 221.

Figure 3:
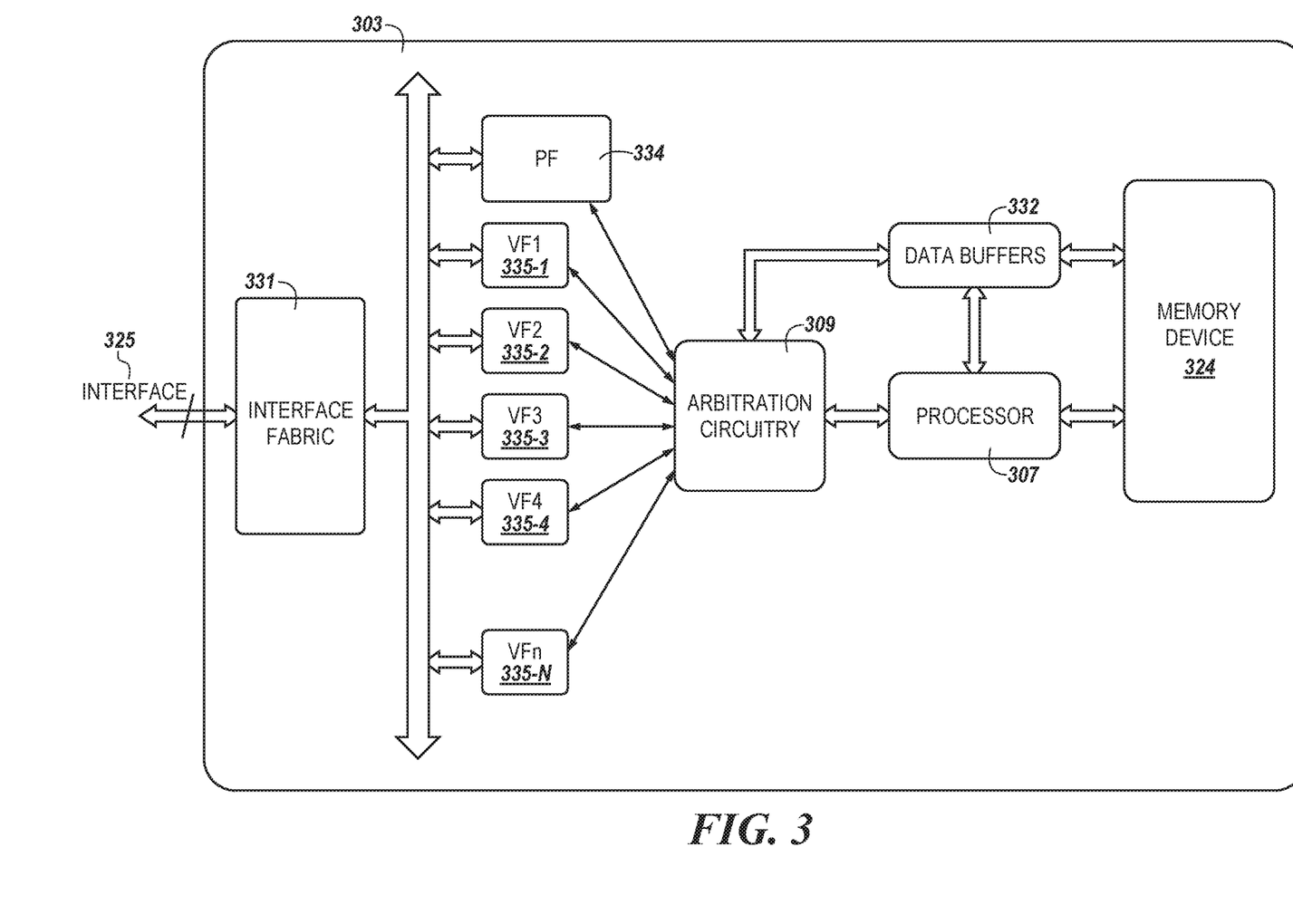
FIG. 3 illustrates an example of a memory sub-system that includes arbitration circuitry in accordance with some embodiments of the present disclosure.

FIG. 3 illustrates an example of a memory sub-system 303 that includes arbitration circuitry 309 in accordance with some embodiments of the present disclosure. The memory sub-system 303 includes the interface fabric 331, a physical function 334, virtual functions 335-1 to 335-N, the arbitration circuitry 309, the data buffers 332, the processor 307, and the memory device 324. The virtual functions 335-1 to 335-N can be referred to as virtual functions 335.

The interface 325 can provide commands to the memory device 303. The commands can be received via the fabric 331. The fabric 331 can be, for example, a PCIe fabric. The fabric 331 is a hardware component that enables communication between a host and a peripheral device such the memory sub-system 303. The fabric 331 can adhere to a direct memory access (DMA)-based architecture as well as a serial physical layer and a link layer. The fabric 331 can enable communications between a host and the memory sub-system via the interface 325. The fabric 331 allows for signals to be provided through the interface 325 to the virtual functions 335 without a protocol conversion. The virtual functions 335 can provide signals representing commands to the arbitration circuitry 309. As previously described, the arbitration circuitry 109 can comprise an ASIC configured to perform the examples described herein. The arbitration circuitry 309 can determine whether to provide commands received via the virtual functions 335 to the processor 307 based on whether a definition of a QOS of an SLA corresponding to the virtual functions 335 has been breached or is satisfied by the commands.

The arbitration circuitry 309 can also determine whether to provide data corresponding to the commands to the data buffers 332. For example, the arbitration circuitry 309 can determine to execute a write command. Responsive to determining to execute the write command, the arbitration circuitry 309 can provide the write command to the processor 307 and can provide the data to be written to the data buffer 332. The processor 307 can execute the write command to write the data stored in the data buffers 332 to the memory device 324.

The arbitration circuitry 309 can also determine to execute a read command. Responsive to determining to executing a read command, the arbitration circuitry 309 can provide the read command to the processor 307. The processor 307 can retrieve data from the memory device 324 responsive to executing the read command. The read data can be stored in the data buffers 332 prior to being provided to the host via the arbitration circuitry 309.

FIG. 4 illustrates an example of arbitration circuitry 409 in accordance with some embodiments of the present disclosure. The arbitration circuitry 409 includes the low priority functions 441 and the high priority functions 442. The arbitration circuitry 409 also includes a timer 443, an arbiter 444, a configuration database 445, and an arbiter 446 (e.g., priority arbiter). The arbitration circuitry 409 can also include a firmware interface 449.

The arbitration circuitry 409 can receive commands via the low priority functions 441 and the high priority functions 442. The virtual functions 335 and the physical function 334 of FIG. 3 can be divided into the low priority functions 441 and the high priority functions 442. For example, a first portion of the virtual functions 335 can be defined as low priority functions 441 while a second portion of the virtual functions 335 can be defined as high priority functions 442.

As used herein, high priority functions 442 can provide commands that are administrative. An administrative command can be a command from a VM that has been designated as being administrative. For example, an administrative VM, can be configured as a secure platform from which a privileged account can perform administrative tasks. Examples of such tasks or accounts include help desk accounts or accounts otherwise tasked with management of the computing system or memory sub-system. The low priority functions 441 can provide commands that are non-administrative and/or are bulk-data commands. As used herein, bulk-data commands can describe commands to access data stored in a memory array of the memory sub-system. For example, the low priority functions 441 can provide commands that originate from applications hosted by VMs instead of from an OS of the VMs.

Commands provided through the high priority functions 442 can be treated differently as compared to the treatment of commands provided through the low priority functions 441. Commands provided through the high priority functions 442 can be given priority over commands provided through the low priority functions 441. The arbiter 446 can provide commands from the high priority functions 442 to the processor of the memory sub-system prior to providing commands from the low priority functions 441.

The arbiter 446 can be coupled to the configuration database 445 and the arbiter 444. The arbiter 444 can receive multiple counters and/or credits corresponding to the SLAs associated with the low priority functions 441. As used herein counters, credits, and credit counters can be used interchangeably. For example, the arbiter 446 can receive a host resource counter, a memory device resource counter, write credit counters, and/or read credit counters. The host resource counter, the memory device resource counter, the IO write credits, and the IO read credits are further described in association with FIG. 5.

In various examples, the arbiter 446 can determine whether commands provided by the VMs and associated with the high priority functions 442 meet a definition of a QOS for the corresponding SLAs. For example, if the commands received via one of the high priority functions meet the definition of the QOS of a corresponding SLA, then the arbiter 446 can provide the commands to the processor of the memory sub-system.

Commands can meet a definition of the QOS, for example, if resources of the memory sub-system used to process the commands are between the defined low threshold and a high threshold of a measurable level of service corresponding to the resources. Resources of the memory sub-system can be described as consumable if processing commands utilizes said resource of the memory sub-system. For example, a QOS can define a minimum bandwidth and a maximum bandwidth in a time period for transferring data responsive to receipt of a read command from a VM. For instance, the QOS can provide for a read minimum of 1 MB/second and/or a maximum of 10 MBs/second. A command can be given priority if it contributes to the 1 MB/second but does not exceed the 10 MBs/second cumulative bandwidth for a given VM. In some examples, a VM can provide multiple commands to a memory sub-system such that by the time it provides a latest command, the VM has read 0.5 MB in a given time period. The latest command can be provided priority over other commands with a same level of priority (e.g., high priority functions 442) if different functions associated with different VMs have met their minimum read bandwidth. However, the priority arbiter 446 can refrain from sending the latest command, corresponding to a VM, to the processor of the memory sub-system if the VM has already exceeded the corresponding bandwidth in a time period.

The priority arbiter 446 can select commands provided via the high priority functions 442 and/or arbiter 444. Commands provided via the high priority functions 442 can be selected prior to selecting commands provided via the arbiter 333. Commands provided via the high priority functions 442 can be selected as they are received by the arbitration circuitry 409.

Commands received from the low priority functions 441 can be provided to the arbiter 444. The arbiter 444 can select commands provided via the low priority functions 441 in a round robin manner. Selecting commands in a round robin manner can include selecting a first command (e.g., first commands) from each of the functions (e.g., low priority functions 441) prior to selecting a second command (e.g., second commands) from any of the functions until a minimum threshold has been meet in a time period for any of the functions. Selecting commands in a round robin manner after a minimum threshold has been met for at least one of the functions can include selecting a first command (e.g., first commands) from each of the functions that have not met their minimum threshold prior to selecting a second command (e.g., second commands) from any of the functions that have not met their minimum threshold or functions that have met their minimum threshold in a time period. Selecting commands in a round robin manner after a maximum threshold has been met for at least one of the functions can include selecting a first command (e.g., first commands) for each of the functions that have not met their maximum threshold prior to selecting a second command (e.g., second commands) for any of the functions that have not met their maximum threshold or function that have met their maximum threshold.

Each of the functions 441 can have one or more counters associated therewith. The counters 450 can include memory configured to represent a counter, credit, and/or weight, among other types of descriptions of aspects (e.g., metrics) of a memory sub-system and/or the commands received from the low priority functions 441. The counters 450 can store a quantity of commands received from the low priority functions 441, a quantity of commands executed, an amount of data read (e.g., read bandwidth), and/or an amount of data stored (e.g., write bandwidth). Each of the counters 450 can be coupled to a timer 443 such that each of the counters, credits, and/or weights can be reset during a time period. The timer 443 can be coupled to a system clock line and/or different mechanism for tracking a duration of time.

The counters 450 can be coupled to input lines 447 and output lines 448. The I/O lines 447 and 448 can be coupled to the data buffers 332 shown in FIG. 3, and to an interface coupling the memory sub-system 103 and the host 102 shown in FIG. 1, for example. The counts, weights, and/or credits stored in the counters 450 can be provided to the arbiter 444 along with the commands received via the low priority functions 441. As such, the low priority functions 441 can be coupled to the arbiter 444 and the counters 450. The counters 441 can also be coupled to the arbiter 444.

The arbiter 444 can be coupled to the configuration database 445. The arbiter 444 can receive thresholds corresponding to the host resource counters, the memory resource counters, the write credits, and/or the read credits from the configuration database 445. Having received the host resource counters, the memory resource counters, the write credits, the read credits, and their corresponding thresholds, the arbiter 444 can determine whether, when, and/or in what order to provide the commands to the arbiter 446.

The arbiter 444 can provide commands in a round robin manner to the arbiter 446. Providing commands round robin includes providing a first command from each of the low priority functions 441 prior to providing a second command from any of the priority functions 441. The arbiter 444 can provide commands from each of the low priority functions 441 that have not reached a minimum threshold for any of the counters 450 prior to providing commands from the low priority functions 441 that have reached the minimum threshold for any of the counters 450. The arbiter 444 can provide commands from each of the low priority functions 441 that have reached a minimum threshold for any of the counters 450 prior to providing commands from any of the low priority functions 441 that have reached a maximum threshold for any of the counters 450.

In various examples, the arbiter 444 can update the counters 450. For instance, the arbiter can update a memory resource counter corresponding to one of the low priority functions 441 each time the arbiter 444 sends a command received via the one of the low priority functions 441 to the priority arbiter 446. The timer 443 can include circuitry configured to reset the counters 450 for a given time period. For example, if the bandwidth utilized, by a VM associated with one of the low priority functions 441, to read data is 5 MB in a first time period, then upon entering a next time period, the timer 443 can reset the counters 450 such that the bandwidth utilized by the VM is reset to 0 MB in a second time period if the counters are incremented. If the counters are decremented, then the counters 450 can be reset to 5 MB for example.

In various examples, the firmware interface 449 can be utilized to update the configuration database 445. A host (e.g., host 202 in FIG. 2) can execute software configured to interface with the firmware interface 449. The software executed by the host can be vendor specific to the host. The software can utilize a virtualization enhancement interface to provide the firmware interface 449 with instructions and/or data that can be used to update the configuration database 445.

In various instances, the firmware interface 449 can be utilized to configure the low priority functions 441 and/or the high priority functions 442. For example, the firmware interface 449 can be utilized to assign the virtual functions 335 in FIG. 3, to the low priority functions 441 and/or the high priority functions 442. Although only two level of priorities are shown herein, more than two levels of priority of the functions can be implemented. In some examples, each level of the functions can be assigned its own arbiter such as shown by the arbiter 444 and the low priority functions 441. Each of the arbiters associated with a priority level of functions can provide commands to a centralized arbiter such as arbiter 446. In other examples, each of the arbiters associated with a priority level of the functions can provide commands to other arbiters until the commands are finally received by a centralized arbiter such as arbiter 446.

The configuration database 445 can be populated prior to receipt of the commands through the low priority functions 441 and/or the high priority functions 442. The configuration database 445 can be updated during runtime and/or in real time after one or more commands have been received via the low priority functions 441 and/or the high priority functions 442.

As an example of the function of the arbitration circuitry 409, commands can be received from the low priority functions 441 and the high priority functions. Commands received by the low priority functions can be provided to the arbiter 444 along with counters 450 associated with given functions from the low priority functions 441. The arbiter 444 can select one command at a time to provide to the arbiter 446. The arbiter 446 can receive the command provided by the arbiter 444 and commands provided by the high priority functions 442. The arbiter 446 can select a command and provide the selected command to the processor of the memory sub-system for execution. If the selected command is a read command, then the data read from a memory device can be provided to the host via the output line 448. If the selected command is a write command, then the data to be written to the memory device can be received from the host and can be provided to the memory device. The data to be written can be received from the host through the input line 447 and can be provided to the memory device via the input line 447. The counters 450 can be updated based on the receipt of the commands, the execution of the commands, and/or the bandwidth of data written or read from a memory device. The counters 450 can be used by the arbiter 444 and the arbiter 446 in selecting a command. The arbiter 444 and the arbiter 446 can also utilize the configuration database 445 to select commands.

Figure 5:
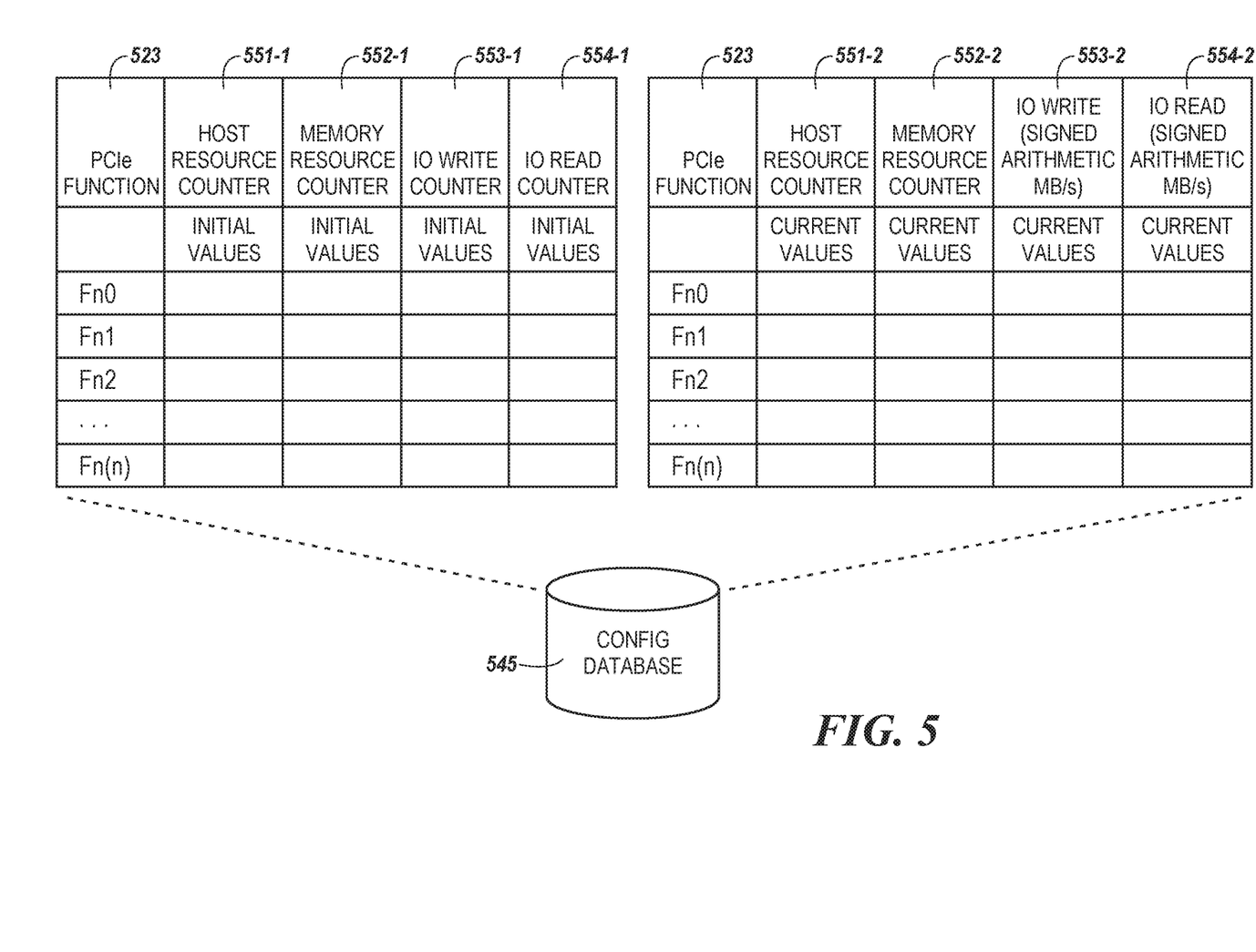
FIG. 5 illustrates an example database in accordance with some embodiments of the present disclosure.

FIG. 5 illustrates an example database 545 in accordance with some embodiments of the present disclosure. The database 545 can also be referred to as a configuration database such as configuration database 445 in FIG. 4.

The database 545 can comprise counters for one or more functions 523 (e.g., Fn0, Fn1, Fn2, . . . , Fn(n)). As used herein, counters can include counters, credits, and/or any other type of identifiers used to track attributes of commands provided by VMs.

Each of the functions 523 can include thresholds and their corresponding counters. The functions 523 are analogous to the functions 335-1 to 335-N and 334 in FIG. 3. In various examples, the counters can be incremented until a threshold value is reached. In other examples, a counter can be decremented until the counter reaches a threshold such as zero, among other possible thresholds. Although not shown in FIG. 5, multiple thresholds can be associated with each of the functions 523. For example, a first threshold and a second threshold can be associated with each of the functions 523. The first threshold and the second threshold can include a low threshold and a high threshold. The lowest threshold and the highest threshold can be relative to whether a corresponding counter is incremented or decremented. For instance, the lowest threshold can be smaller than the highest threshold if counters are incremented. The lowest threshold can be greater than the highest threshold if counters are decremented.

For instance, if a counter has an initial value of 10 MB/s and the counted is decremented, then a first threshold can be 2 MB/s and a second threshold can be 0 MB/s. The 2 MB/s threshold can indicate that a minimum amount of data that is to be transferred is 8 MB/s. The 0 MB/s threshold can indicate that the maximum amount of data that is to be transferred is 10 MB/s. If a counter is incremented and the initial value is 0 MB/s, then a first threshold can be 8 MB/s and a second threshold can be 10 MB/s. The 8 MB/s threshold can indicate that a minimum amount of data that is to be transferred is 8 MB/s. The 10 MB/s threshold can indicate that the maximum amount of data that is to be transferred is 10 MB/s.

In examples where the counters are decremented, the counters can be signed. A signed counter provides for the possibility of a negative balance. The counters can increment an initial value (e.g., an initial value for the host resource counter 551-1, an initial value for the memory resource counter 552-1, an initial value for the write credits 553-1, and/or an initial value for the read credits 554-1) at the beginning of each time period. If incrementing the initial value to the counter renders the counter greater than zero, then commands provided by associated VMs can be processed. If incrementing the initial value to the counter renders the counter small than zero, then commands received from the associated VMs may not be processed (e.g. at least until the corresponding counter is reset or otherwise changed).

Each of the functions 523 include host resource counters 551-1 and 551-2, memory resource counters 552-1 and 552-2, write credits 553-1 and 553-2, and read credits 554-1 and 554-2. As used herein the credits 553-1, 553-2, 554-1, and 554-2 can also be referred to as counters. The counters 551-1, 552-1, 553-1, and 554-1 can store initial values. The host resource counters 551-1 include the quantity of commands that can be received from a VM. The memory resource counter 552-1 includes the quantity of commands that can be executed by a memory sub-system. The write credit 553-1 includes an amount of data that can be written to a memory device utilizing commands originating from a VM. The read credit 554-1 includes an amount of data that can be read from a memory device utilizing commands originating from a VM. The write credits 553-1 and 553-2 and the read credits 554-1 and 554-2 can be provided in an amount of data per time period (e.g., MBs/s).

The counters 551-2, 552-2, 553-2, and 554-2 can store a value that is updated (e.g., current values). The counters 551-2, 552-2, 553-2, and 554-2 can comprise signed arithmetic values (e.g., signed arithmetic—MB/s). The initial values can be added to the current values once during a time period. For instance, the host resource counter 551-1 can be added to the host resource counter 551-2, the memory resource counter 552-1 can be added to the memory resource counter 552-2, the write credits counter 553-1 can be added to the write credits 553-2, and the read credits 554-1 can be added to the read credits 554-2 once each time period.

Figure 6:
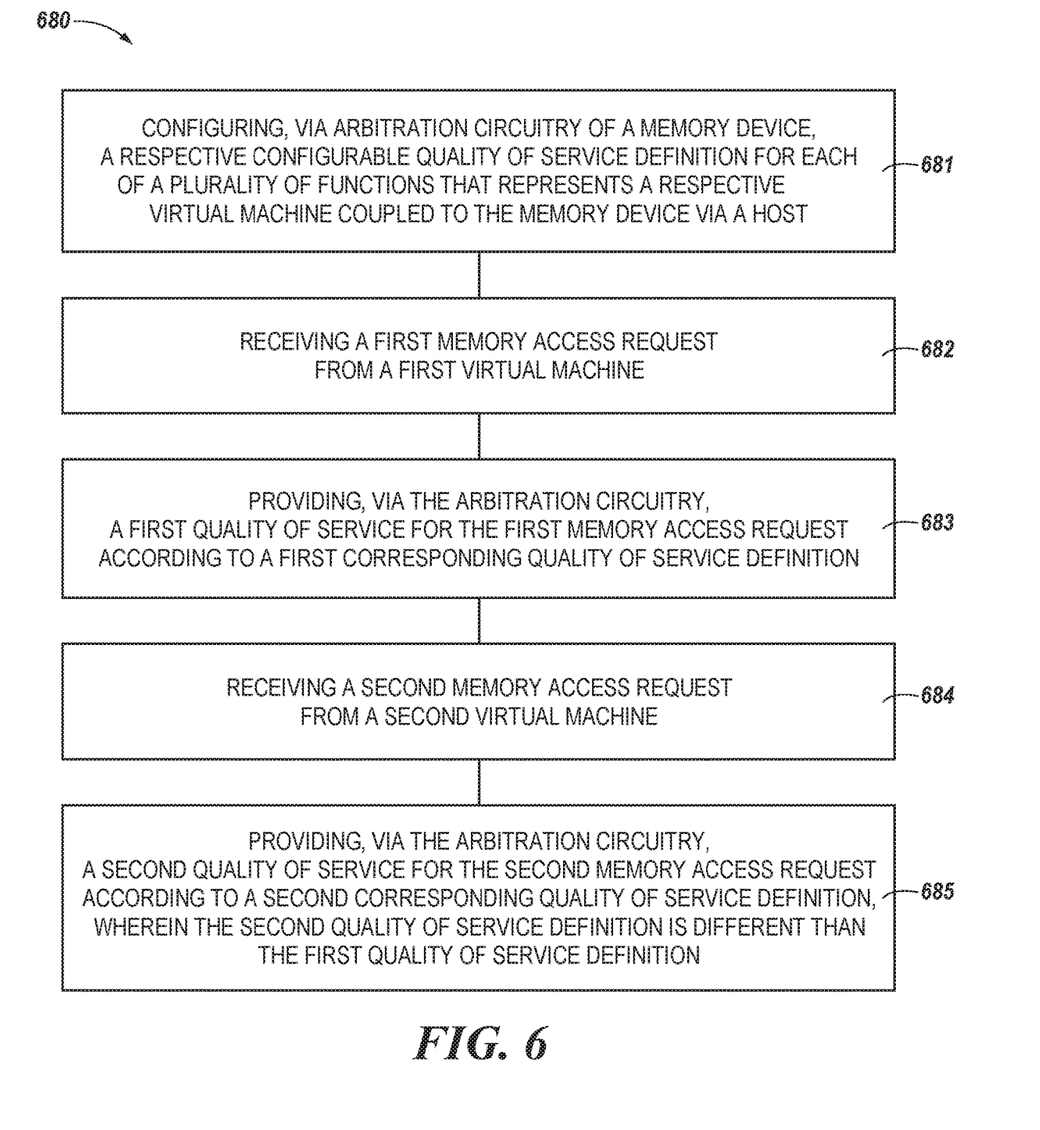
FIG. 6 is a flow diagram of an example method for arbitration circuitry in accordance with some embodiments of the present disclosure.

FIG. 6 is a flow diagram of an example method 680 corresponding to arbitration circuitry in accordance with some embodiments of the present disclosure. The method 680 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 680 is performed by the arbitration circuitry 409 of FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 681, a respective configurable definition of a QOS can be configured, via arbitration circuitry of a memory device, for each of multiple functions that represents a respective virtual machine coupled to the memory device via a host. At 682, a first memory access request can be received from a first virtual machine. The first memory access request can be received via a function associated with the first virtual machine. At 683 a first QOS for the first memory access request can be provided, via the arbitration circuitry, according to a first corresponding definition of the QOS. The first QOS can be provided utilizing one or more counters. That is, the one or more counters can represent the lower threshold and the upper threshold of a measurable level of service used to define the first QOS. At 684, a second memory access request can be received from a second virtual machine. The second memory access request can be received via a function associated with the second virtual machine, for example. At 685, a second QOS for the second memory access request can be provided, via the arbitration circuitry, according to a second corresponding QOS definition, where the second QOS definition is different than the first QOS definition. The definition of the second QOS can differ from the definition of the first QOS in that the measurable levels of service specified in the definitions may differ. The second QOS can also differ from the first QOS in that the lower threshold and the upper threshold of measurable levels of service shared between the second QOS and the first QOS can differ between the first QOS and the second QOS.

The method 680 can further include storing, in a database associated with the memory device, the respective configurable QOS definitions. The method 680 can also include reconfiguring, via the arbitration circuitry, the respective QOS definition in runtime. For example, the respective QOS definitions can be reconfigured after memory access requests have been received by the arbitration circuitry.

The method 680 can also include providing the first QOS for the first memory access request and providing the second QOS for the second memory access request without a hypervisor managing traffic between the memory and the first virtual machine or second virtual machine. For example, the hypervisor can provide the first QOS and the second QOS without managing the first QOS and/or the second QOS. Managing can include enforcing a QOS of a service level agreement. The QOS can be enforced by enforcing the lower threshold and the upper threshold of measurable levels of service included in the definition of the QOS. The arbitration circuitry can be configured to enforce the first QOS of the first memory access request. The arbitration circuitry can also be configured to provide the second QOS for the second memory access request. Enforcing a QOS can include preventing the VM from using more bandwidth than is defined by the QOS. This contrasts with some conventional approaches that rely on a hypervisor to provide such enforcement. Such embodiments of the present disclosure can beneficially provide the VMs with near native access to the memory sub-system.

In some examples, a processing device can be coupled to the memory device and can be configured to receive multiple commands from multiple virtual machines via a host interface. The processing device can also be configured to associate each of the plurality of commands with a respective function representing a respective virtual machine from which each of the plurality of commands was received. The processing device can also be configured to setup a respective definition of a respective QOS for each respective function regarding consumption of resources of the memory device, where the processing device comprises arbitration circuitry to handle each of the plurality of commands on a per function basis according to the definition. As used herein, the terms "on a per function basis" describes that the limitations applied to commands can be defined for a corresponding function.

The processing device can further be configured to setup the definition of the respective QOS for low priority functions. Setting up the definition of a QOS can include storing a lower threshold and an upper threshold for a measurable level of service used in a QOS in memory (e.g., the database 445 of FIG. 4) of a memory sub-system. The definition of the QOS for high priority functions and the low priority functions can include different specific definitions of the QOS for any of a number of measurable levels of service associated with access to memory. The arbitration circuitry can comprise a first arbiter to provide those of the plurality of commands associated with high priority functions to a different processing device prior to providing commands associated with the low priority functions to the different processing device.

The first arbiter can be configured to provide those of the plurality of commands associated with the high priority functions to the different processing device in an order in which those of the plurality of commands were received. The processing device can also comprise a second arbiter coupled to the first arbiter to provide those of the plurality of commands associated with the low priority functions to the first arbiter according to a deficit round robin for the QOS of the low priority functions. As used herein, round robin describes that a first command from each of the functions can be processed prior to processing a second command from any of the functions. Deficit round robin describes that a first command from each of the functions can be processed prior to processing a second command from any of the functions unless the any of the functions has used up its allowed bandwidth. For example, a first command from a first function may not be processed prior to processing a second command from the other functions responsive to the first function utilizing its limit of bandwidth.

The arbitration circuitry can further comprise a database to receive the respective definition of the respective QOS including a quantity of credit counters for those of the plurality of commands associated with the low priority functions. The arbitration circuitry can also comprise a timer to provide an indication to the second arbiter of when the quantity of credit counters is to be replenished. The second arbiter is further configured to discount the quantity of credit counters for a respective one of the plurality of commands associated with the low priority function according to use of an input/output path for execution of the respective command. Discounting the credit counters can represent a consumption of resources of the memory sub-system. For example, discounting the credit counters can represent the use of a bandwidth of the memory sub-system. As such, the credits can be discounted until there are no more credits or the credits are negative to reflect that a bandwidth corresponding to a function/VM has been consumed.

The second arbiter can further be configured to refrain from providing those of the plurality of commands associated with the low priority functions to the first arbiter if corresponding credit counters are equal to or less than zero. The QOS can further comprise a first quantity of credit counters for an input path and a second quantity of credit counters for an output path for those of the plurality of commands associated with the low priority functions.

The second arbiter can further be configured to discount the first quantity of credit counters for a respective one of the plurality of commands associated with the low priority function according to use of the input path for execution of the respective command. The second arbiter can also be configured to discount the second quantity of credit counters for the respective command according to use of the output path for execution of the respective command.

The processing device can further be configured to associate bulk-data commands with the low priority functions and associate administrative commands with the high priority functions. As used herein, administrative commands are commands used to perform administrative functions for a memory sub-system. For example, administrative commands can be commands to activate security features of the memory sub-system, among other examples of commands that can be used to perform administrative functions for the memory sub-system. The processing device can also receive the respective definition of the respective QOS for each respective function regarding consumption of resources of the memory device from the host interface and setup the respective definition in a database. The controller can further receive updates to the respective definition from the host interface and update the respective definition in the database.

Figure 7:
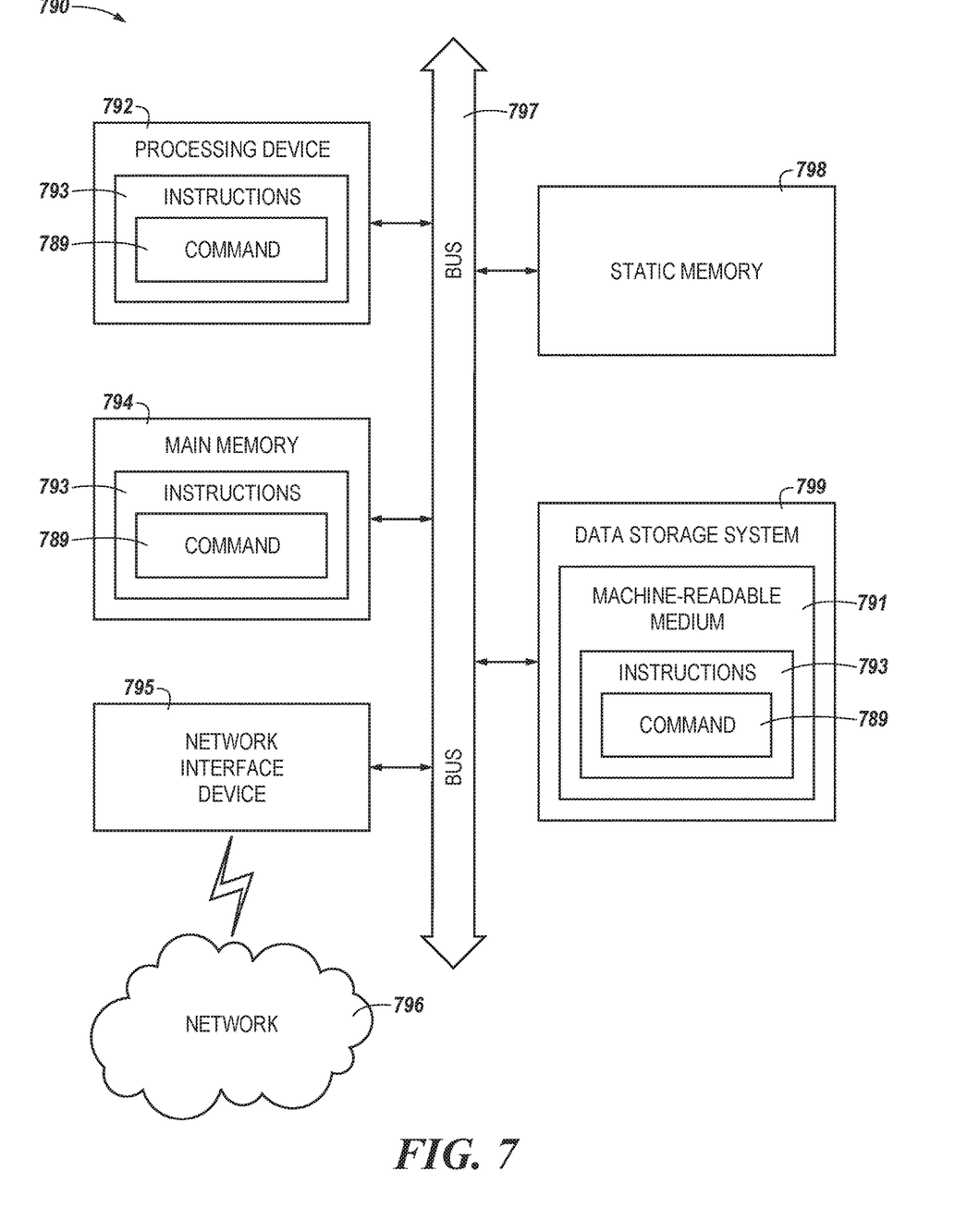
FIG. 7 is a block diagram of an example computer system in which embodiments of the present disclosure may operate.

FIG. 7 illustrates an example machine of a computer system 790 within which a set of instructions, for causing the machine to perform one or more of the methodologies discussed herein, can be executed. In some embodiments, the computer system 790 can be analogous to the memory sub-system controller 104 of FIG. 1. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or another machine capable of executing a set of instructions (sequential or otherwise) that specify actions to be taken by that machine. Further, while a single machine is illustrated, the term "machine" shall also be taken to include a collection of machines that individually or jointly execute a set (or multiple sets) of instructions to perform one or more of the methodologies discussed herein.

The example computer system 790 includes a processing device 792, a main memory 794 (e.g., read-only memory (ROM), flash memory, dynamic random access memory (DRAM) such as synchronous DRAM (SDRAM) or Rambus DRAM (RDRAM), etc.), a static memory 798 (e.g., flash memory, static random access memory (SRAM), etc.), and a data storage system 799, which communicate with each other via a bus 797.

The processing device 792, which can be analogous to the processor 107 in FIG. 1, represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 792 can also be one or more special-purpose processing devices such as an application specific integrated circuit (ASIC), a field programmable gate array (FPGA), a digital signal processor (DSP), network processor, or the like. The processing device 792 is configured to execute instructions 793 for performing the operations and steps discussed herein. The computer system 790 can further include a network interface device 795 to communicate over the network 796.

The data storage system 799 can include a machine-readable storage medium 791 (also known as a computer-readable medium) on which is stored one or more sets of instructions 793 or software embodying one or more of the methodologies or functions described herein. The instructions 793 can also reside, completely or at least partially, within the main memory 794 and/or within the processing device 792 during execution thereof by the computer system 790, the main memory 794 and the processing device 792 also constituting machine-readable storage media. The machine-readable storage medium 791, data storage system 799, and/or main memory 794 can correspond to the memory sub-system 103 of FIG. 1.

In one embodiment, the instructions 793 include instructions to implement functionality corresponding to the arbitration circuitry 409 of FIG. 4. The instructions can include a command instruction 789 associated with performing function arbitration for memory commands (e.g., arbitration circuitry 409 in FIG. 4). While the machine-readable storage medium 791 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device;
   a host interface;
   a processing device coupled to the memory device and the host interface, the processing device configured to:
   receive a plurality of commands from a plurality of virtual machines via the host interface;
   associate each of the plurality of commands with a respective function from a plurality of functions that represents a respective virtual machine from which each of the plurality of commands was received; and
   setup a respective definition of a respective quality of service for each of the plurality of functions regarding consumption of resources of the memory device;
   assign a quantity of credit counters to each of the plurality of functions based on the respective definition of the respective quality of service;
   update a configuration database that stores the quantity of credit counters with an updated quantity of credit counters after receipt of the plurality of commands, wherein the configuration database is runtime configurable by a host, and
wherein the quantity of credit counters and the configuration database are updated by the host responsive to receipt of the plurality of commands;
update, via the arbitration circuitry, a memory that stores the quantity of credit counters with the update quantity of credit counters from the configuration database;
provide the plurality of commands and the updated quantity of credit counters to an arbitration circuitry to handle each of the plurality of commands on a per function basis according to the updated quantity of credit counters, wherein the updated quantity of credit counters are provided from the memory and wherein the memory and the configuration database are different.

2. The system of claim 1, wherein processing device is further configured to setup the definition of the respective quality of service for low priority functions.

3. The system of claim 2, wherein the arbitration circuitry comprises a first arbiter to provide those of the plurality of commands associated with high priority functions to a different processing device prior to providing commands associated with the low priority functions to the different processing device.

4. The system of claim 3, wherein the first arbiter is further configured to provide those of the plurality of commands associated with the high priority functions to the different processing device in an order in which those of the plurality of commands were received.

5. The system of claim 3, wherein the processing device further comprises a second arbiter coupled to the first arbiter to provide those of the plurality of commands associated with the low priority functions to the first arbiter according to a deficit round robin for the quality of service of the low priority functions.

6. The system of claim 5, wherein the arbitration circuitry further comprises:
the configuration database configured to receive the respective definition of the respective quality of service including the updated quantity of credit counters for those of the plurality of commands associated with the low priority functions; and
a timer configured to provide an indication to the second arbiter of when the updated quantity of credit counters are to be replenished.

7. The system of claim 6, wherein the second arbiter is further configured to discount the updated quantity of credit counters for a respective one of the plurality of commands associated with the low priority function according to use of an input/output path for execution of the respective command.

8. The system of claim 6, wherein the second arbiter is further configured to refrain from providing those of the plurality of commands associated with the low priority functions to the first arbiter if corresponding credit counters are equal to or less than zero.

9. The system of claim 8, wherein the quality of service further comprises a first quantity of credit counters for an input path and a second quantity of credit counters for an output path for those of the plurality of commands associated with the low priority functions; and
wherein the second arbiter is further configured to:
discount the first quantity of credit counters for a respective one of the plurality of commands associated with the low priority function according to use of the input path for execution of the respective command; and
discount the second quantity of credit counters for the respective command according to use of the output path for execution of the respective command.

10. The system of claim 2, wherein the processing device is further configured to:
associate bulk-data commands with the low priority functions; and
associate administrative commands with the high priority functions.

11. The system of claim 1, wherein the processing device is further configured to:
receive the respective definition of the respective quality of service for each respective function regarding consumption of resources of the memory device from the host interface;
setup the respective definition in the configuration database;
receive updates to the respective definition from the host interface; and
update the respective definition in the configuration database.

12. A method, comprising:
configuring, via arbitration circuitry of a memory device, a respective configurable quality of service definition for each of a plurality of functions that represents a respective virtual machine coupled to the memory device via a host;
assigning a quantity of credit counters to each of the plurality of functions based on the quality of service definition;
receiving a first memory access request from a first virtual machine;
updating a configuration database that stores the quantity of credit counters with an updated quantity of credit counters,
wherein the configuration database is runtime configurable by the host;
wherein the quantity of credit counters and the configuration database are updated by the host responsive to an execution of the first memory access request;
updating, via the arbitration circuitry, a memory that stores the quantity of credit counters with the update quantity of credit counters from the configuration database; and
providing the first memory access request and the updated quantity of credit counters to the arbitration circuitry, wherein the updated quantity of credit counters are provided from the memory;
wherein the memory and the configuration database are different
providing, via the arbitration circuitry, a first quality of service for the first memory access request according to a first corresponding quality of service definition utilizing corresponding credit counters from the updated quantity of credit counters;
receiving a second memory access request from a second virtual machine; and
providing the second memory access request and the updated quantity of credit counters to the arbitration circuitry, wherein the updated quantity of credit counters are provided from the memory;
providing, via the arbitration circuitry, a second quality of service for the second memory access request according to a second corresponding quality of service definition utilizing different corresponding credit counters from the updated quantity of credit counters, wherein the second quality of service definition is different than the first quality of service definition.

13. The method of claim 12, further comprising:
storing, in the configuration database associated with the memory device, the respective configurable quality of service definitions; and
reconfiguring, via the arbitration circuitry, the respective quality of service definitions in runtime.

14. The method of claim 12, further comprising providing the first quality of service for the first memory access request and providing the second quality of service for the second memory access request without a hypervisor managing traffic between the memory and the first virtual machine or second virtual machine.

15. A system, comprising:
a first processing device;
a memory device;
a second processing device coupled to the memory device and the first processing device, the second processing device configured to:
receive a command to setup a definition of a respective quality of service for each of a plurality of functions that represents a respective virtual machine, wherein the definition of the respective quality of service describes consumable resources of the memory device that are assigned to the plurality of functions;
receive a plurality of commands and a plurality of counters, corresponding to the definition, associated with the plurality of functions;
provide the plurality of commands and the plurality of counters to the first processing device from a memory that stores the plurality of counters;
receive a plurality of updated counters via a firmware interface and wherein the plurality of updated counters are used to configure a configuration database that stored the plurality of updated counters,
wherein the configuration database is runtime configurable by the host, and
wherein the plurality of counters and the configuration database are updated by the host responsive to data being read from the memory device or written to the memory device;
update, via the arbitration circuitry, the memory that stores the plurality of counters with the plurality of updated of counters from the configuration database; and
provide the plurality of updated counters to the first processing device from the memory after the first plurality of commands are provided to the first processing device; and
wherein the second processing device comprises arbitration circuitry configured to handle each of the plurality of commands associated with the plurality of functions provided that corresponding definitions of the respective quality of service are met, in view of the plurality of counters and the plurality of updated counters, such that the plurality of functions do not consume more resources than is represented by the corresponding definitions.

16. The system of claim 15, wherein the second processing device is further configured to set the plurality of updated counters including host resource counters, memory device resource counters, write credit counters, and read credit counters, wherein:
the host resource counters are configured to limit a quantity of commands of corresponding functions from being processed;
the memory device resource counters are configured to limit a quantity of resources of a memory device from being utilized on a per function basis;
the write credit counters are configured to limit data written to the memory device on the per function basis; and
the read credit counters are configured to limit data read from the memory device on the per function basis.

17. The system of claim 16, wherein:
the host resource counters include:
threshold host resource counters configured to store a threshold of the quantity of commands received on a per function basis; and
first quantity of current values to represent the quantity of commands received on the per function basis; and
the memory device resource counters include:
threshold memory device resource counters configured to store a threshold of the quantity of commands performed on the per function basis; and
a second quantity of current values to represent the quantity of commands performed on the per function basis.

18. The system of claim 16, wherein
the write credit counters include:
threshold write credit counters configured to store a threshold of an amount of data that is written to the memory device on the per function basis; and
a third quantity of current values to represent the amount of data written to the memory device on the per function basis; and
the read credit counters include:
threshold read credit counters configured to store a threshold of an amount of data read from the memory device on the per function basis; and
a fourth quantity of current values to represent the amount of data read from the memory device on the per function basis.

19. The system of claim 16, wherein the second processing device is further configured to receive a command to set the plurality of counters for each of the plurality of functions from a host.

* * * * *